United States Patent

Rapp et al.

(10) Patent No.: US 9,309,713 B2
(45) Date of Patent: Apr. 12, 2016

(54) STRETCHED STRIPS FOR SPACER AND SEALED UNIT

(71) Applicant: Infinite Edge Technologies, LLC, White Bear Lake, MN (US)

(72) Inventors: Eric B. Rapp, Avoca, WI (US); Paul Trpkovski, Buffalo, WY (US); Gary R. Matthews, Des Plaines, IL (US)

(73) Assignee: Guardian IG, LLC, Sun Prairie, WI (US)

( * ) Notice: Subject to any disclaimer, the term of this patent is extended or adjusted under 35 U.S.C. 154(b) by 0 days.

(21) Appl. No.: 14/055,575

(22) Filed: Oct. 16, 2013

(65) Prior Publication Data

US 2014/0044983 A1 Feb. 13, 2014

Related U.S. Application Data

(62) Division of application No. 12/836,350, filed on Jul. 14, 2010, now Pat. No. 8,586,193.

(60) Provisional application No. 61/225,274, filed on Jul. 14, 2009.

(51) Int. Cl.
*E06B 3/663* (2006.01)
*B21D 13/08* (2006.01)
(Continued)

(52) U.S. Cl.
CPC ............ *E06B 3/66309* (2013.01); *B21D 13/08* (2013.01); *B21D 41/02* (2013.01); *B32B 3/263* (2013.01); *B32B 3/28* (2013.01); *E06B 3/67304* (2013.01); *E06B 2003/6639* (2013.01);
(Continued)

(58) Field of Classification Search
CPC ................... Y10T 29/49826; Y10T 29/49828; Y10T 29/49829; Y10T 29/49883; B21D 13/04; B21D 13/045; B21D 13/08; B21D 1/05; B32B 3/263; B32B 3/28; B21B 2031/021
USPC ........... 72/167, 185, 186, 197, 198, 199, 205, 72/226, 234, 379.6; 52/786.11, 786.13
See application file for complete search history.

(56) References Cited

U.S. PATENT DOCUMENTS 3,150,707 A * 9/1964 Howell ............................ 72/177
3,165,815 A * 1/1965 Wogerbauer .................... 29/897
(Continued)

FOREIGN PATENT DOCUMENTS

JP 5-76948 A * 3/1993 ............. B21D 13/04

OTHER PUBLICATIONS

Unknown, "Allmetal—Making windows more exciting.", Allmetal Catalog Pages from the 1990's, 2 pages.
(Continued)

*Primary Examiner* — Edward Tolan
(74) *Attorney, Agent, or Firm* — Remarck Law Group PLC

(57) ABSTRACT

A spacer for a sealed unit is formed of a stretched elongate strip of material, such as metal. The elongate strip is longitudinally stretched, causing a reduction in the thickness of the material. Stretching is performed by applying a tension across a segment of an elongate strip. The tension can be applied to the elongate strip by passing the elongate strip through at least two spaced sets of rollers. A first set of rollers operating at a first speed engages with the elongate strip and a second set of rollers operating at a second speed applies a tension to the elongate strip to cause stretching of the material. Corrugated rollers can also be used to form the material into an undulating shape.

16 Claims, 10 Drawing Sheets

(51) Int. Cl.
*E06B 3/673* (2006.01)
*B21D 41/02* (2006.01)
*B32B 3/26* (2006.01)
*B32B 3/28* (2006.01)

(52) U.S. Cl.
CPC .... *Y10T29/49826* (2015.01); *Y10T 428/12382* (2015.01); *Y10T 428/12389* (2015.01); *Y10T 428/24529* (2015.01)

(56) References Cited

U.S. PATENT DOCUMENTS

| | | | |
|---|---|---|---|
| 3,394,573 A * | 7/1968 | Bodnar | 72/196 |
| 4,027,517 A * | 6/1977 | Bodnar | 72/177 |
| 4,092,842 A * | 6/1978 | Oser et al. | 72/379.6 |
| 4,269,055 A * | 5/1981 | Sivachenko et al. | 72/180 |
| 4,411,146 A * | 10/1983 | Sulasaari et al. | 72/180 |
| 4,499,938 A * | 2/1985 | Toti | 160/236 |
| 4,528,835 A * | 7/1985 | Ekmark | 72/301 |
| 4,753,096 A | 6/1988 | Wallis | |
| 5,080,326 A * | 1/1992 | Price et al. | 266/103 |
| 5,186,034 A * | 2/1993 | Hunt | 72/187 |
| 5,439,716 A * | 8/1995 | Larsen | 428/34 |
| 6,038,825 A * | 3/2000 | Shah et al. | 52/172 |
| 6,131,364 A * | 10/2000 | Peterson | 52/786.13 |
| 6,183,879 B1 * | 2/2001 | Deeley | 428/604 |
| 6,197,129 B1 * | 3/2001 | Zhu et al. | 148/400 |
| 6,497,130 B2 * | 12/2002 | Nilsson | 72/252.5 |
| 6,655,184 B2 * | 12/2003 | Meaney et al. | 72/196 |
| 7,011,893 B2 * | 3/2006 | Hodgson et al. | 428/593 |
| 7,322,220 B2 * | 1/2008 | Park et al. | 72/234 |
| 8,151,542 B2 * | 4/2012 | Trpkovski | 52/786.13 |
| 8,424,592 B2 * | 4/2013 | Meshenky et al. | 165/151 |
| 8,596,024 B2 * | 12/2013 | Trpkovski | 52/786.13 |
| 8,661,670 B2 * | 3/2014 | Bruck et al. | 29/890 |
| 2007/0029073 A1 * | 2/2007 | Teshima et al. | 165/109.1 |
| 2007/0273077 A1 * | 11/2007 | Kling | 270/41 |
| 2008/0295556 A1 * | 12/2008 | Hodgson et al. | 72/11.1 |

OTHER PUBLICATIONS

Unknown, "Insulating Glass Production", Glass Digest May 15, 1994, vol. 73, No. 5, 4 pages.

* cited by examiner

STRETCHED STRIPS FOR SPACER AND SEALED UNIT

CROSS REFERENCE TO RELATED APPLICATIONS

This application is a Divisional of U.S. patent application Ser. No. 12/836,350, filed on Jul. 14, 2010, entitled STRETCHED STRIPS FOR SPACER AND SEALED UNIT; which claims priority to U.S. Provisional Application Ser. No. 61/225,274 filed on Jul. 14, 2009, entitled STRETCHED STRIPS FOR SPACER AND SEALED UNIT, the disclosure of which is incorporated by reference herein in its entirety.

BACKGROUND

An insulating glazing unit is one example of a sealed unit and often includes two or more facing sheets of glass separated by at least one air space. The air space reduces heat transfer through the unit to insulate an interior of a building from external temperature variations. As a result, the energy efficiency of the building is improved, and a more even temperature distribution is achieved within the building.

A spacer can be used to maintain the desired separation between the glass sheets. Some spacers are made of one or more elongate strips of material, such as metal. In some spacer configurations, it is desirable for the elongate strip material to have particular size and shape characteristics, but it can be difficult to obtain a material having such characteristics using traditional material processing techniques.

SUMMARY

In general terms, this disclosure is directed to a stretched elongate strip. In one example, the stretched elongate strip is a metal strip that is arranged and configured as a spacer for a sealed unit, such as an insulated glazing unit.

One aspect is a spacer for a sealed unit, where the spacer comprises at least one longitudinally stretched elongate strip of metal having an undulating shape.

Another aspect is a method of forming a spacer for a sealed unit. The method comprises applying a tension to a segment of an elongate strip of material, the tension being sufficient to cause longitudinal stretching of the elongate strip; and forming a spacer from at least the elongate strip of material.

Yet another aspect is a spacer formed according to a process comprising applying a tension to a segment of an elongate strip of material, the tension being sufficient to cause longitudinal stretching of the elongate strip; and forming a spacer from at least the elongate strip of material.

A further aspect is a system for stretching an elongate strip of material for a spacer of a sealed unit. The system comprises a first set of rollers having first surfaces; a second set of rollers having second surfaces, wherein at least one of the first and second pair of rollers includes corrugated rollers; a drive mechanism coupled to at least one roller of the first set of rollers; and a link coupling the first set of rollers to the second set of rollers; wherein the stretching device is arranged and configured to rotate the first and second sets of rollers to apply a tension to a segment of an elongate strip of material as the elongate strip of material is passes through the first and second sets of rollers.

Another aspect is a system comprising means for longitudinally stretching an elongate strip; and means for shaping the elongate strip into an undulating shape while longitudinally stretching.

A further aspect is a stretching device comprising a first pair of rollers having first surfaces; a second pair of rollers having second surfaces; a drive mechanism coupled to at least one of the rollers of the first pair of rollers; and a link coupling the first pair of rollers to the second pair of rollers; wherein the stretching device is arranged and configured to rotate the first and second pairs of rollers, such that the linear speed of the second surfaces is greater than the speed of the first surfaces to stretch an elongate strip material when the elongate strip material is passed through the first and second pairs of rollers.

A further aspect is a method of forming an elongate strip, the method comprising passing an elongate strip material through a first pair of rotating rollers having first surfaces, the first surfaces having a first linear speed; passing the elongate strip material through a second pair of rotating rollers having second surfaces, the second surfaces having a second speed, wherein the second speed is greater than the first speed; and stretching the elongate strip material to form a thinned elongate strip material.

DETAILED DESCRIPTION

Figure 1:
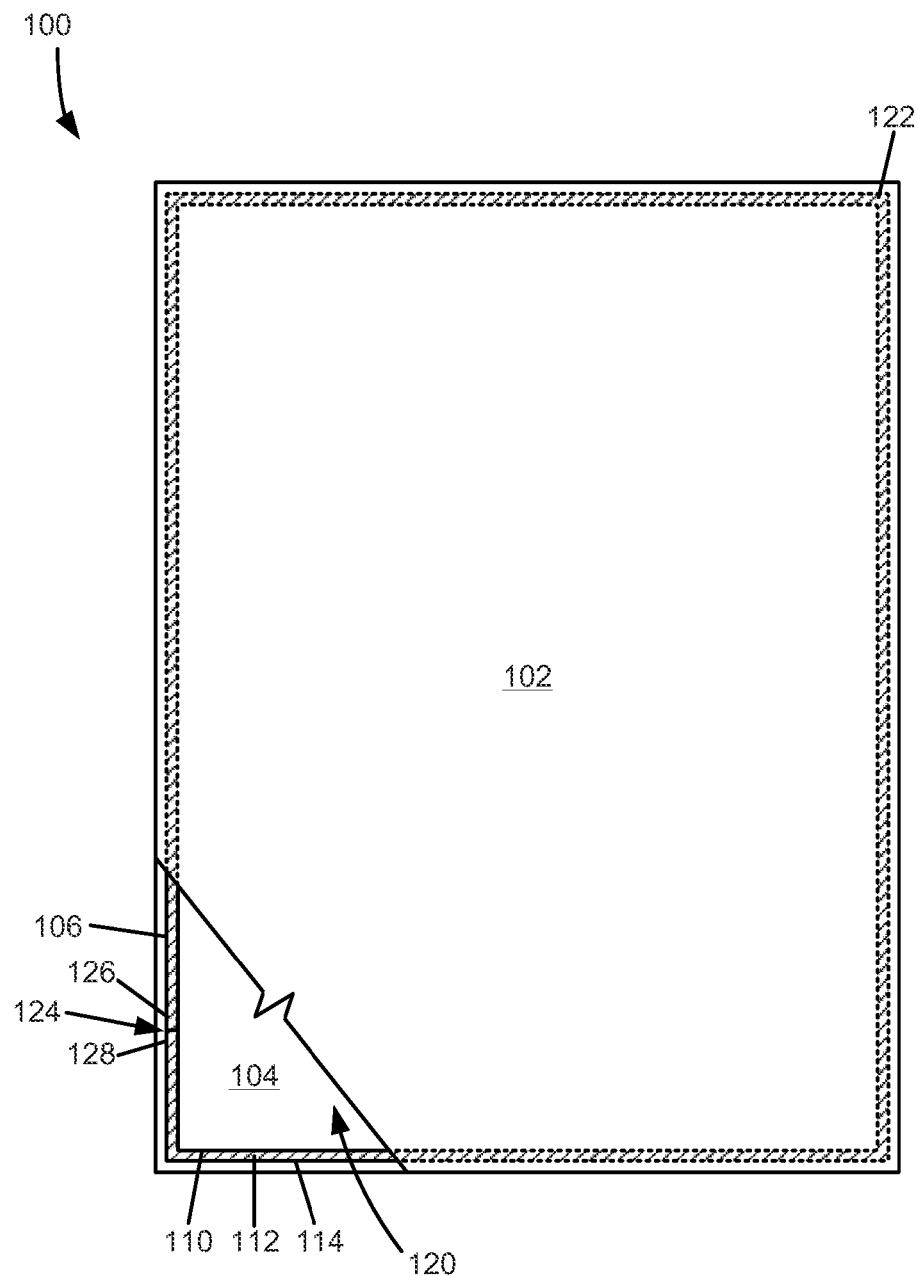
FIG. 1 is a schematic front view of an example sealed unit according to the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

A spacer is commonly used to maintain the space between the two or more facing sheets of glass. Such spacers are often made of metal, which inherently has at least some ability to transfer heat. Such heat transfer is undesirable because it reduces the efficiency of the insulating glazing unit. One technique for reducing the amount of heat transferred by the metal is to reduce the thickness of the metal. In general, thinner metals transfer less heat than thicker metals.

On the other hand, thin metal has several disadvantages. One disadvantage is that thinner metal generally has less strength than thicker metal. Accordingly, a certain thickness of metal may be needed in order to obtain the desired strength characteristics for a given application. Another disadvantage is that techniques for mass producing very thin metals are more expensive, translating into an increased cost of the material (per unit of weight) as the thickness of the metal decreases.

Figure 2:
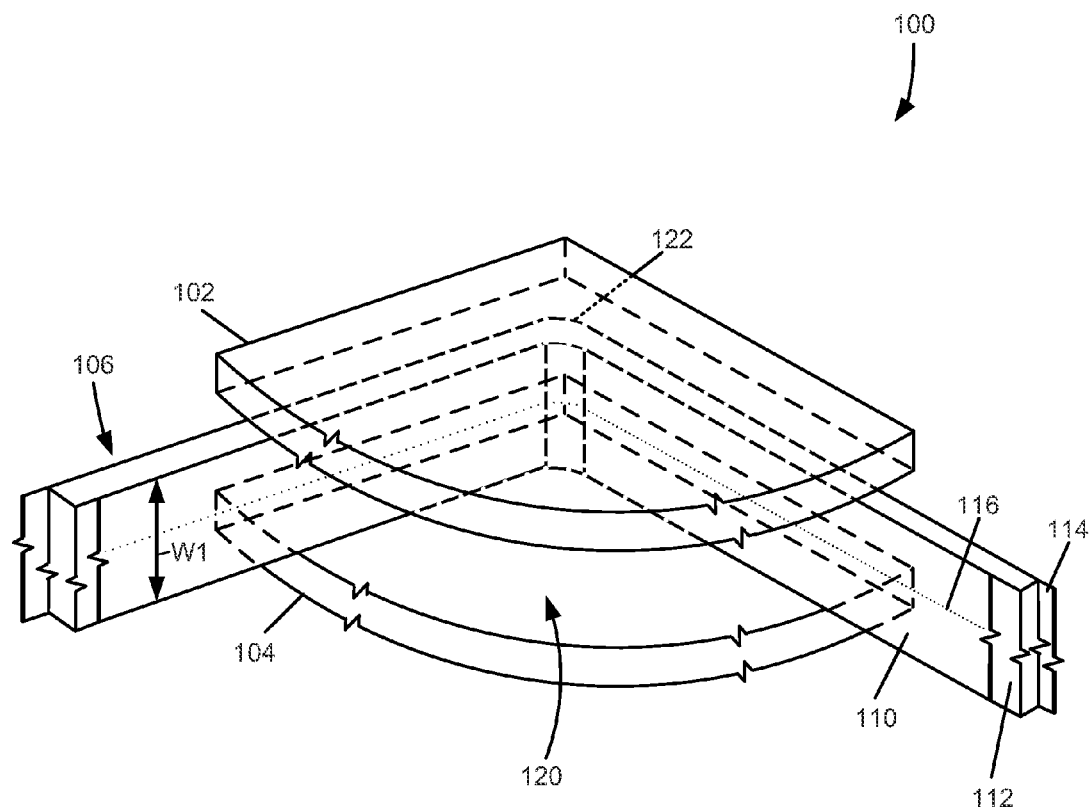
FIG. 2 is a schematic perspective view of a corner section of the example sealed unit shown in FIG. 1.

FIGS. 1 and 2 illustrate an example sealed unit 100 according to the present disclosure. FIG. 1 is a schematic front view of sealed unit 100. FIG. 2 is a schematic perspective view of a corner section of sealed unit 100. In the illustrated embodiment, sealed unit 100 includes sheet 102, sheet 104, and spacer 106. Spacer 106 includes elongate strip 110, filler 112, and elongate strip 114. Elongate strip 110 includes apertures 116 (visible in FIG. 2).

Sheets 102 and 104 are made of a material that allows at least some light to pass through. Typically, sheets 102 and 104 are made of a transparent material, such as glass, plastic, or other suitable materials. Alternatively, a translucent or semi-transparent material is used, such as etched, stained, or tinted glass or plastic. More or fewer layers or materials are included in other embodiments. For example, some embodiments include three sheets. A triple pane unit can be made, for example, by using two spacers, each arranged to separate two of the sheets from each other. A triple pane unit can alternatively be made by using a single spacer that is arranged around the periphery of a central sheet that is somewhat smaller than the other sheets. The spacer extends between and maintains a space between the two outside sheets, while also supporting the central sheet in a spaced relationship to the two outside sheets.

One example of a sealed unit 100 is an insulated glazing unit. Another example of a sealed unit 100 is a window assembly. In further embodiments, a sealed unit is an automotive part (e.g., a window, a lamp, etc.). In other embodiments, a sealed unit is a photovoltaic cell or solar panel. In some embodiments, a sealed unit is any unit having at least two sheets (e.g., 102 and 104) separated by a spacer. The spacer maintains a distance of separation between the sheets to define an interior space therebetween. Other embodiments include other sealed units.

In some embodiments, the spacer 106 includes elongate strip 110, filler 112, and elongate strip 114. Spacer 106 includes first end 126 and second end 128 (shown in FIG. 1) that are connected together at joint 124 (shown in FIG. 1). Spacer 106 is disposed between sheets 102 and 104 to maintain a desired space between sheets 102 and 104. Typically, spacer 106 is arranged near to the perimeter of sheets 102 and 104. However, in other embodiments, spacer 106 is arranged between sheets 102 and 104 at other locations of sealed unit 100. Spacer 106 is able to withstand compressive forces applied to sheets 102 and/or 104 to maintain an appropriate space between sheets 102 and 104. Interior space 120 is bounded on two sides by sheets 102 and 104 and is surrounded by spacer 106 or a portion of spacer 106. In some embodiments spacer 106 is a window spacer.

Elongate strips 110 and 114 are typically long and thin strips of a solid material, such as metal or plastic. An example of a suitable metal is stainless steel. An example of a suitable plastic is a thermoplastic polymer, such as polyethylene terephthalate. Some embodiments include different materials, such as one elongate strip made of metal and another elongate strip made of plastic. A material with low or no permeability is preferred in some embodiments, such as to prevent or reduce air or moisture flow therethrough. Other embodiments include a material having a low thermal conductivity, such as to reduce heat transfer through spacer 106. Other embodiments include other materials.

Figure 3:
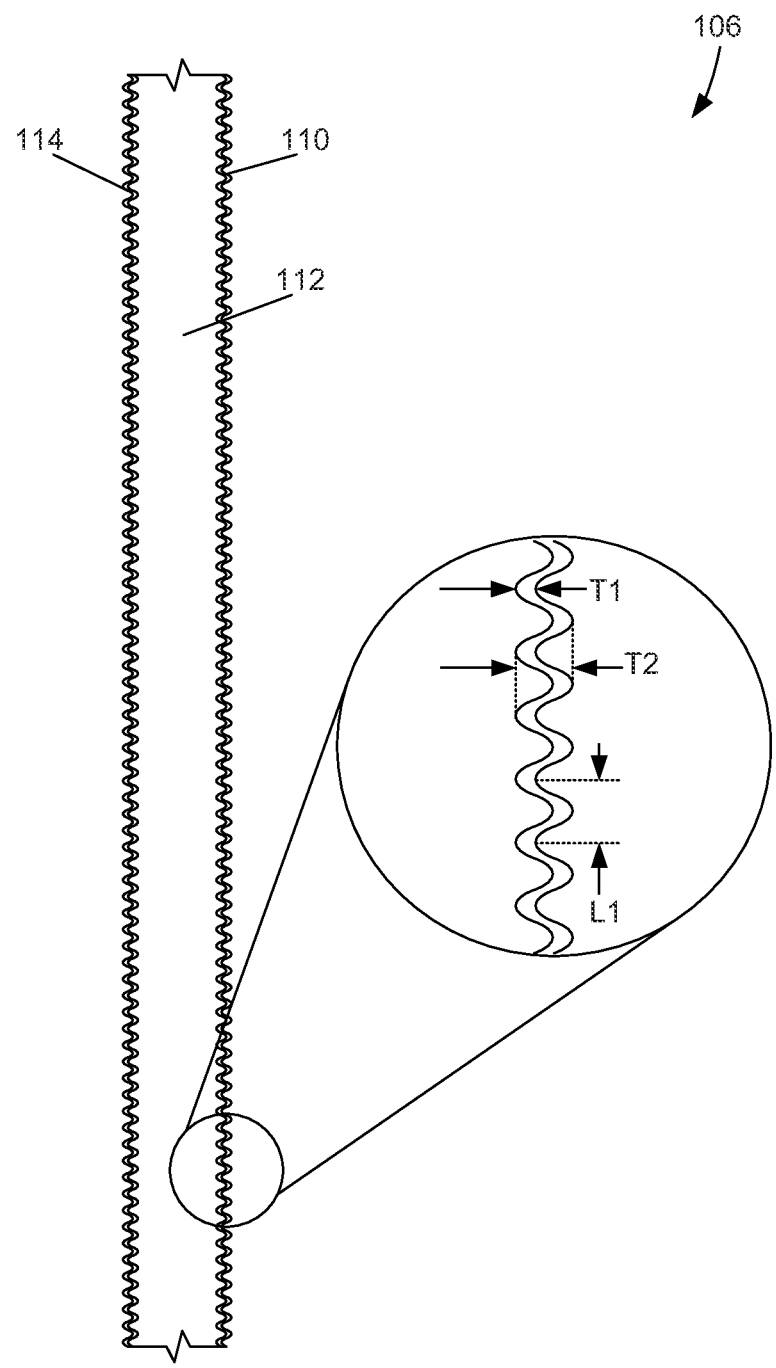
FIG. 3 is a schematic front view of a portion of an example spacer of the sealed unit shown in FIG. 1.

In some embodiments, one or more of elongate strips 110 and/or 114 include a laterally undulating shape, such as a sinusoidal or other undulating shape (such as shown in FIG. 3). The undulating shape provides various advantages in different embodiments. For example, the undulating shape provides increases the compression strength of the spacer 106 in some embodiments. In some embodiments the undulating shape provides additional bending and torsional flexibility, and also provides stretching flexibility along a longitudinal axis of the elongate strips. An advantage of such flexibility is that the elongate strips 110 and 114 (or the entire spacer 106) are more easily manipulated during manufacturing without causing permanent damage (e.g., kinking, creasing, or breaking) to the elongate strips 110 and 114 or to the spacer 106. However, some embodiments are substantially rigid and do not include such flexibility. The undulating shape provides increased surface area at the edge per unit of length of the spacer. The increased surface area improves the bond between the spacer to one or more sheets. In addition, the increased surface area distributes forces present at the intersection of an edge of the elongate strip and a surface of the one or more sheets to reduce the chance of breaking, cracking, or otherwise damaging the sheet at the location of contact.

In some embodiments, filler 112 is arranged between elongate strip 110 and elongate strip 114. Filler 112 is a deformable material in some embodiments. Being deformable allows spacer 106 to flex and bend, such as to be formed around corners of sealed unit 100. In some embodiments, filler 112 is a desiccant that acts to remove moisture from interior space 120. Desiccants include molecular sieve and silica gel type desiccants. One particular example of a desiccant is a beaded desiccant, such as PHONOSORB® molecular sieve beads manufactured by W. R. Grace & Co. of Columbia, Md. If desired, an adhesive is used to attach beaded desiccant between elongate strips 110 and 114.

In some embodiments, filler 112 is a material that provides support to elongate strips 110 and 114 to provide increased structural strength. Without filler 112, the thin elongate strips 110 and 114 may have a tendency to bend or buckle, such as when a compressive force is applied to one or both of sheets 102 and 104. Filler 112 fills (or partially fills) space between elongate strips 110 and 114 to resist deformation of elongate strips 110 and 114 into filler 112. In addition, some embodiments include a filler 112 having adhesive properties that further allows spacer 106 to resist undesired deformation. More specifically, because the filler 112 is trapped in the space between the elongate strips 110 and 114 and the sheets 102 and 104, the filler 112 cannot leave the space when a force is applied (without displacement of the elongate strips or sheets). This increases the strength of the spacer 106 as compared with the strength of the elongate strips 110 and 114 alone. Thus, in some embodiments, spacer 106 does not rely solely on the strength and stability of elongate strips 110 and 114 to maintain appropriate spacing between sheets 102 and 104 and to prevent buckling, bending, or breaking. An advantage is that the strength and stability of elongate strips 110 and 114 themselves can be reduced, such as by reducing the material thickness (e.g., T1 shown in FIG. 3) of elongate strips 110 and 114. In doing so, material costs may be reduced. Furthermore, thermal transfer through elongate strips 110 and 114 is also reduced. In some embodiments, filler 112 is a matrix desiccant material that not only acts to provide structural support between elongate strips 110 and 114, but also functions to remove moisture from interior space 120.

Examples of filler materials include adhesive, foam, putty, resin, silicon rubber, and other materials. Some filler materials are a desiccant or include a desiccant, such as a matrix desiccant material. Matrix desiccant typically includes desiccant and other filler material. Examples of matrix desiccants include those manufactured by W.R. Grace & Co. and H.B. Fuller Corporation. In some embodiments, filler 112 includes a beaded desiccant that is combined with another filler material.

In some embodiments, filler 112 is made of a material providing thermal insulation. The thermal insulation reduces heat transfer through spacer 106 both between sheets 102 and 104, and between the interior space 120 and an exterior side of spacer 106.

In some embodiments, elongate strip 110 includes a plurality of apertures 116 (shown in FIG. 2), also known as gilling. Apertures 116 allow gas and moisture to pass through elongate strip 110. As a result, moisture located within interior space 120 is allowed to pass through elongate strip 110 where it is removed by desiccant of filler 112 by absorption or adsorption. In one possible embodiment, elongate strip 110 includes a regular and repeating arrangement of apertures. For example, one possible embodiment includes apertures in a range from about 10 to about 1000 apertures per inch, and preferably from about 500 to about 800 apertures per inch. Other embodiments include other numbers of apertures per unit length. Apertures 116 are also (or alternatively) used for registration in some embodiments. For example, apertures 116 can be used to support muntin bars or clips for supporting muntin bars. In yet another embodiment, apertures reduce thermal transfer through elongate strip 110. In one example, apertures 116 have a diameter in a range from about 0.002 inches (about 0.005 cm) to about 0.05 inches (about 0.13 cm) and preferably from about 0.005 inches (about 0.013 cm) to about 0.02 inches (about 0.05 cm). Some embodiments include multiple aperture sizes, such as one aperture size for gas and moisture passage and another aperture size for registration of accessories or other devices, such as muntin bars. Apertures 116 are made by any suitable method, such as cutting, punching, drilling, laser forming, or the like.

Spacer 106 is connectable to sheets 102 and 104. In some embodiments, filler 112 connects spacer 106 to sheets 102 and 104. In other embodiments, filler 112 is connected to sheets 102 and 104 by a fastener. An example of a fastener is a sealant or an adhesive, as described in more detail below. In yet other embodiments, a frame, sash, or the like is constructed around sealed unit 100 to support spacer 106 between sheets 102 and 104. In some embodiments, spacer 106 is connected to the frame or sash by another fastener, such as adhesive. Spacer 106 is fastened to the frame or sash prior to installation of sheets 102 and 104 in some embodiments.

Ends 126 and 128 (shown in FIG. 1) of spacer 106 are connected together in some embodiments to form joint 124, thereby forming a closed loop. In some embodiments a fastener is used to form joint 124. The example embodiment illustrated in FIG. 1 includes a single joint 124. Other embodiments, however, can include multiple joints, such as two or more. Some embodiments include joints at each corner, such as four joints for a square or rectangular sealed unit 100 having four corners. Joints can be formed at corners 122 or along sides of the sealed unit 100 in various embodiments.

Spacer 106 and sheets 102 and 104 cooperatively define boundaries of an interior space 120 of sealed unit 100. In some embodiments, interior space 120 acts as an insulating region, reducing heat transfer through sealed unit 100.

A gas is sealed within interior space 120. In some embodiments, the gas is air. Other embodiments include oxygen, carbon dioxide, nitrogen, or other gases. Yet other embodiments include an inert gas, such as helium, neon or a noble gas such as krypton, argon, and the like. Combinations of these or other gases are used in other embodiments. In other embodiments, interior space 120 is a vacuum or partial vacuum.

FIG. 3 is a schematic front view of a portion of an example spacer 106. FIG. 3 includes an enlarged view of a portion of spacer 106. Spacer 106 includes elongate strip 110, filler 112, and elongate strip 114. In this embodiment, elongate strips 110 and 114 have an undulating shape, while other embodiments include other undulating shapes or no undulating shapes. In some embodiments the shape of elongate strip 110 is different than the shape of elongate strip 114, such as having larger or smaller undulations.

In some embodiments, elongate strips 110 and 114 are formed of a ribbon of material, which is then bent into the undulating shape, such as described herein. In some embodiments, the elongate strip material is metal, such as steel, stainless steel, aluminum, titanium, a metal alloy, or other metal. Other embodiments include other materials, such as plastic, carbon fiber, graphite, or other materials or combinations of these or other materials. Some embodiments include elongate strips 110 and 114 of different materials, such as one elongate strip made of metal and another elongate strip made of plastic. Alternatively, two different metals or two different plastics are used in some embodiments. Some examples of the undulating shape include sinusoidal, arcuate, square, rectangular, triangular, and other desired shapes.

In one embodiment, undulations are formed in the elongate strips 110 and 114 by passing a ribbon of elongate strip material through a roll-former. An example of a suitable roll-former is a set of corrugated rollers, such as including a pair of rollers. As the flat ribbon of material is passed between the corrugated rollers, the teeth of the roller bend the ribbon into the undulating shape. Depending on the shape of the teeth, different undulating shapes can be formed. In some embodiments, the undulating shape is sinusoidal. In other embodiments, the undulating shape has another shape, such as squared, triangular, angled, or other regular or irregular shape.

One of the benefits of the undulating shape is that the flexibility of elongate strips 110 and 114 is increased over that of a flat ribbon, including bending and torsional flexibility, in some embodiments. The undulating shape of elongate strips 110 and 114 resist permanent deformation, such as kinks and fractures, in some embodiments. This allows elongate strips 110 and 114 to be more easily handled during manufacturing without damaging elongate strips 110 and 114. The undulating shape also increases the structural stability of elongate strips 110 and 114 to improve the ability of spacer 106 to withstand compressive and torsional loads. Some embodiments of elongate strips 110 and 114 are also able to extend and contract (e.g., stretch longitudinally), which is beneficial, for example, when spacer 106 is formed around a corner. In some embodiments, the undulating shape reduces or eliminates the need for notching or other stress relief.

In one example, elongate strips 110 and 114 have material thicknesses T1. In some embodiments, T1 is less than about 0.01 inches, 0.005 inches, 0.004 inches, 0.003 inches, 0.001 inches, or 0.0001 inches. T1 is typically in a range from about 0.0001 inches (about 0.00025 cm) to about 0.01 inches (about 0.025 cm), and preferably from about 0.0001 inches (about 0.00025 cm) to about 0.004 inches (about 0.01 cm). In some embodiments, T1 is in a range from about 0.001 inches (about 0.0025 cm) to about 0.004 inches (about 0.01 cm). In another possible embodiment, T1 is in a range from about 0.001 inches (about 0.0025 cm) to about 0.003 inches (0.0076 cm). Thin material thicknesses can reduce material costs and also reduce thermal conductivity through elongate strips 110 and 114. In some embodiments, thin material thicknesses are possible because the undulating shape of elongate strips 110 and 114 increases the structural strength of elongate strips. In some embodiments the thicknesses are obtained by stretching the metal from a larger material. In some embodiments the thicknesses (e.g., thickness T1) are average thicknesses over one period of the undulating shape, across several (e.g., 3-5) periods of the undulating shape, or across a unit of length, such as over 0.25 inches (about 0.6 cm), 0.5 inches (about 1.3 cm), one inch, one foot, or across the entire length of the elongate strip. In other embodiments, the thicknesses are maximum or minimum thicknesses.

In some embodiments, elongate strips 110 and 114 have width T1 (such as illustrated more clearly in FIG. 2). In some embodiments, W1 is less than about 12 inches (about 30 cm), 6 inches (about 15 cm), 2 inches (about 5 cm), 1 inch (about 2.5 cm), 0.6 inches (about 1.5 cm), 0.5 inches (about 1.3 cm), or 0.2 inches (about 0.5 cm). In some embodiments, W1 is in a range from about 0.2 inches (about 0.5 cm) to about 12 inches (about 30 cm). In another embodiment, W1 is in a range from about 0.1 inches (about 0.25 cm) to about 2 inches (about 5 cm). In yet another embodiment, W1 is in a range from about 0.3 inches (about 0.8 cm) to about 1 inch (about 2.5 cm).

In one example, the undulating shape of elongate strips 110 and 114 defines a waveform having a peak-to-peak amplitude and a peak-to-peak period. The peak-to-peak amplitude is also the overall thickness T2 (shown in FIG. 3) of elongate strips 110 and 114. T2 is typically in a range from about 0.005 inches (about 0.013 cm) to about 0.1 inches (about 0.25 cm), and preferably from about 0.02 inches (about 0.05 cm) to about 0.04 inches (about 0.1 cm). In some embodiments T2 is less than about 0.1 inches (about 0.25 cm), 0.04 inches (about 0.1 cm), 0.02 inches (about 0.05 cm), 0.01 inches (about 0.025 cm), or 0.005 inches (about 0.013 cm). L1 is the peak-to-peak period of undulating elongate strips 110 and 114. L1 is typically in a range from about 0.005 inches (about 0.013 cm) to about 0.1 inches (about 0.25 cm), and preferably from about 0.02 inches (about 0.05 cm) to about 0.04 inches (about 0.1 cm). In some embodiments L1 is less than about 0.1 inches (about 0.25 cm), 0.04 inches (about 0.1 cm), 0.02 inches (about 0.05 cm), 0.01 inches (about 0.025 cm), or 0.005 inches (about 0.013 cm). Larger or smaller waveforms are used in other possible embodiments. Yet other embodiments include other dimensions than described in these examples.

Additional examples of possible spacers and methods of making spacers are disclosed in the following co-pending patent applications: U.S. Publication No. 2009/0120035, titled Sealed Unit and Spacer; U.S. Publication No. 2009/0120036, titled Box Spacer With Sidewalls; U.S Publication No. 2009/0120018, titled Sealed Unit and Spacer with Stabilized Elongate Strip; and U.S. Publication No. 2009/0120019, titled Reinforced Window Spacer, the disclosures of which are hereby incorporated by reference in their entireties. Additional means for assembling or forming a spacer for a sealed unit are also disclosed in these patent applications.

Although specific spacer configurations are shown in FIGS. 1-3, other embodiments include other spacer configurations, such as traditional roll formed box spacers. Another example of a spacer is a U-shaped spacer. For example, an elongate strip can be bent to form a U-shaped spacer by bending end portions. The U-shaped spacer includes a base portion and two side portions arranged substantially perpendicular to the base portion. The U-shaped spacer can be formed by bending, such as using one or more roll formers. Such roll formers are examples of means for assembling a spacer for a sealed unit.

Figure 4:
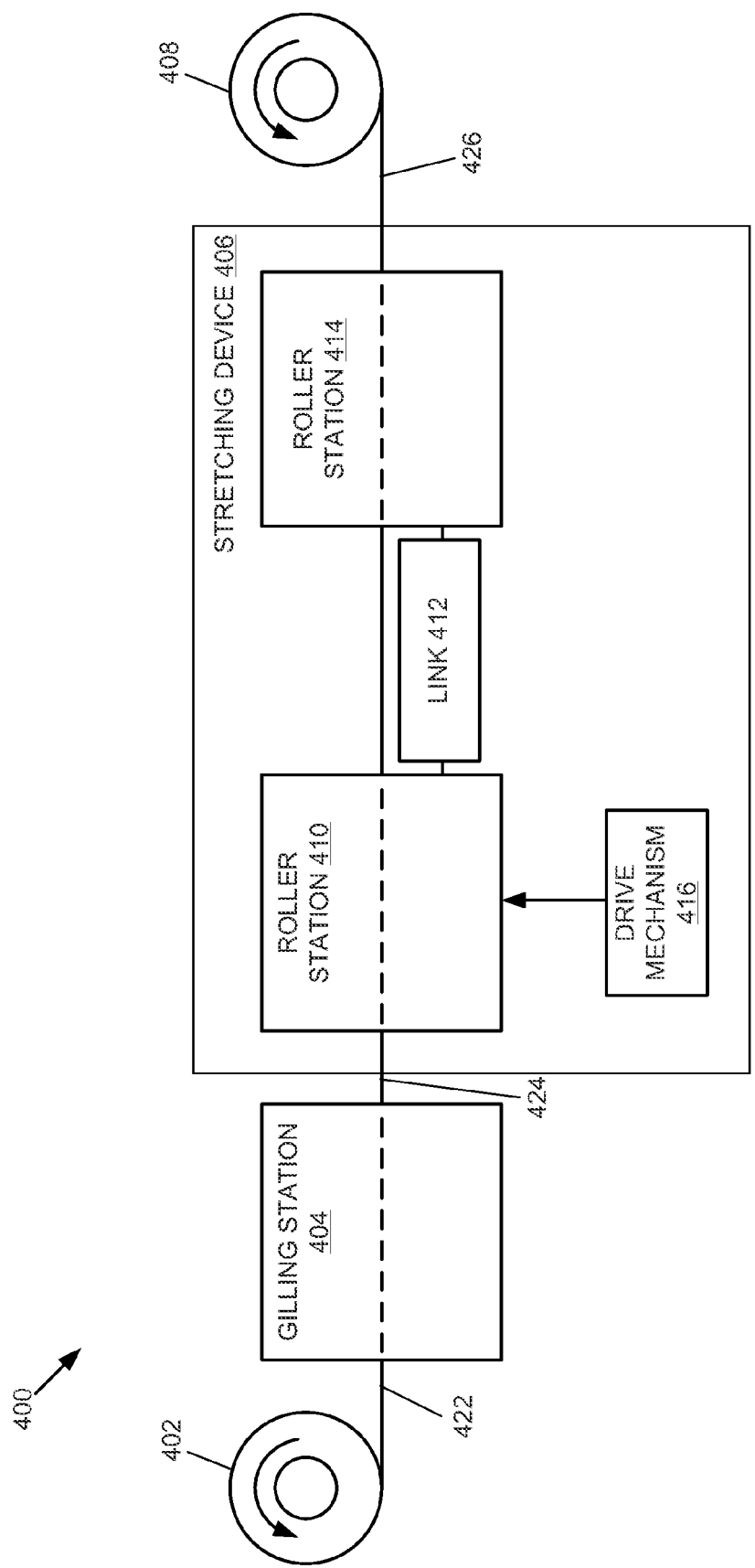
FIG. 4 is a schematic block diagram of a system for forming elongate strips.

FIG. 4 is a schematic block diagram of a system 400 for forming elongate strips. A method of forming elongate strips is also illustrated in FIG. 4. The system 400 includes a material roll 402, a gilling station 404, a stretching device 406, and a second material roll 408. In this example, stretching device 406 includes roller station 410, link 412, roller station 414, and drive mechanism 416. In some embodiments, stretching device 406 is an example of a means for longitudinally stretching an elongate strip. In some embodiments, stretching device 406 is a means for shaping the elongate strip into an undulating shape.

The processes begins, in this example, with material roll 402 which includes strip material 422. As one example, material roll 402 includes a core, which has strip material 422 wound around the core. The material roll 402 is supported so that it is free to rotate to supply material as needed. The thickness of the material is somewhat larger than the ultimate thickness desired, and so system 400 is operable to reduce the thickness of the material 422. In another possible embodiment, elongate strip material 422 is provided in substantially linear segments without roll 402.

A portion of material 422 is unrolled from material roll 402 and fed into gilling station 404. Gilling station 404 operates to form apertures in material 422 to form gilled material 424. Gilling station 404 is selectively operable to form the apertures, or can be operated to allow material 422 to pass through without gilling. For example, referring briefly to FIG. 2, if elongate strip 110 is being formed, gilling station 404 is operated to form apertures 116 (also sometimes referred to as breathe holes). On the other hand, elongate strip 114 does not include apertures in some embodiments. Accordingly, if elongate strip 114 is being formed, gilling station 404 is operated to allow strip material 422 to pass through without forming apertures therein. In some embodiments, multiple strips are processed simultaneously, such as by stacking elongate strips together or processing them in a side-by-side orientation. In some embodiments, gilling station 404 is arranged and configured to form apertures 116 in one or more of the multiple elongate strips.

An example of gilling station 404 including a perforating disc, which can be raised or lowered for selective operation. Other embodiments include other methods of forming apertures in material 422, such as using a laser, drill, punch, or other device suitable for forming apertures. Some embodiments do not include gilling station 404.

Some embodiments further include a heating device. An example of a heating device is a heat gun. Other embodiments include other heating devices. However, in yet other embodiments the elongate strip material 424 is not heated prior to stretching. In some embodiments the elongate strip material 424 is substantially at room temperature.

Gilled material 424 (or material 422) is then fed to stretching device 406. Stretching device 406 operates to stretch the material 424 to reduce the overall or average thickness of the material to produce thinned elongate strip material 426. If desired, the thinned elongate strip material 424 can be rewound into material roll 408 for convenient storage. Alternatively, thinned elongate strip material 426 can be fed directly to another machine for further processing (e.g., cutting, bending, roll forming, chemical processing, etc.) or for manufacturing or assembly as part of another product, such as a spacer, sealed unit, or window assembly. In yet another possible embodiment, elongate strip material 426 is maintained in substantially linear segments and placed into a temporary storage location.

One example of stretching device 406 includes roller stations 410 and 414, which are driven by a drive mechanism 416 and link 412. In some embodiments, roller stations 410 and 414 each include a pair of rollers through which the material 424 is fed. The roller station 410 receives and engages material 424, which is then fed through roller station 410 to roller station 414. The material 424 is then received at roller station 414, which engages material 424. Stretching device 406 operates roller stations 410 and 414 such that material 424 is stretched as it passes through, such as by moving the surfaces of the rollers at roller station 414 at a higher speed than the surfaces of rollers at roller station 410. The different speeds generate a tension on elongate strip material 424 between roller stations 410 and 414. Because roller stations 410 and 414 both firmly engage material 424, the material 424 is caused to stretch between roller stations 410 and 414. Stretching results in a thinning of the material, which results in the production of thinned material 426. In some embodiments, roller station 414 is an example of a means for shaping the elongate strip into an undulating shape.

In some embodiments, a single drive mechanism 416 is used to supply power to one of roller stations 410 and 414. Link 412 acts to transfer power from that roller station 410 to the other roller station 414, or from drive mechanism 416 to either of roller stations 410 or 414. In the illustrated example, drive mechanism 416 provides power directly to roller station 410, and link 412 transfers a portion of the power to roller station 414. In another possible embodiment, drive mechanism provides power to roller station 414, or to link 412. Other embodiments include separate drive mechanisms for each roller station. Examples of drive mechanism 416 include electric motors (including any of a variety of alternating current or direct current types of motors, including AC induction, AC synchronous, DC stepper, brushless DC, brushed DC, or servo motors), pneumatic or hydraulic drives, or a prime mover, such as an engine. Examples of link 412 include a belt, a gear assembly, a chain, or other linking device.

Figure 5:
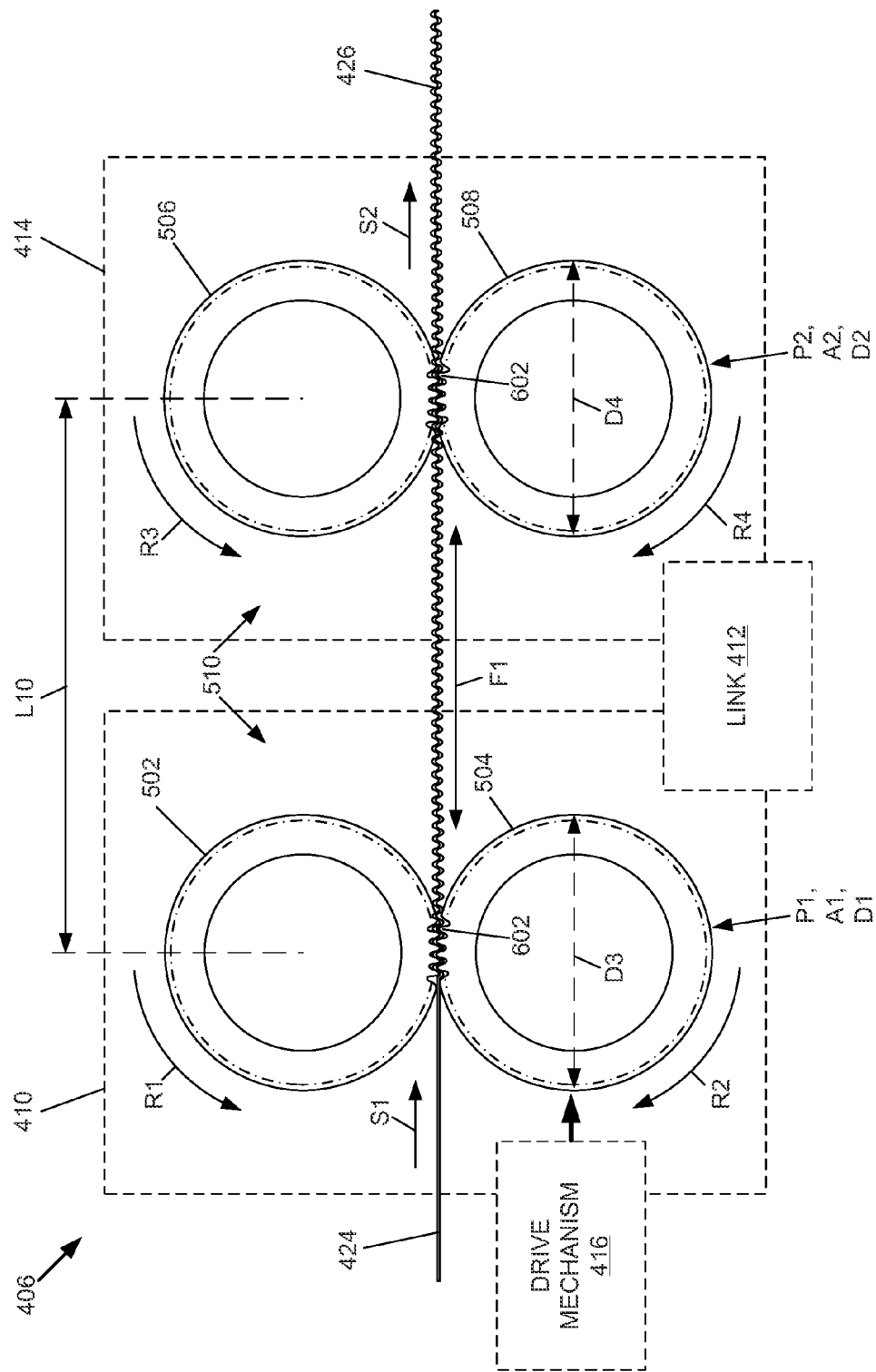
FIG. 5 is a schematic block diagram of an example embodiment of a stretching device.

FIG. 5 is a schematic block diagram illustrating an example embodiment of stretching device 406. In this example, stretching device 406 includes station 410, link 412, station 414, and drive mechanism 416.

In some embodiments, station 410 (sometimes referred to herein as an isolation station) includes a pair of rollers, including roller 502 and roller 504, and station 414 (sometimes referred to herein as a stretching station) includes a second pair of rollers, including roller 506 and roller 508. Rollers 502, 504, 506, and 508 are sometimes referred to herein collectively as rollers 510. In some embodiments, rollers 510 are made of a metal. In other possible embodiments, other materials are used, such as plastic, wood, rubber, nylon, or other suitable materials. Further, some embodiments include combinations of materials or layers of materials, such as a roller having a metal body and an exterior layer of rubber.

In some embodiments, one or more of rollers 510 have a generally smooth outer surface. In other embodiments, one or more of rollers 510 include a corrugated surface including a plurality of teeth 602 that extend from the outer surfaces of rollers 510 and along the length of the rollers 510. (The dotted and dashed line extending around rollers 510 represent the plurality of teeth that can extend entirely around rollers 510 in some embodiments.) Teeth 602 are illustrated and described in more detail with reference to FIG. 6.

Figure 6:
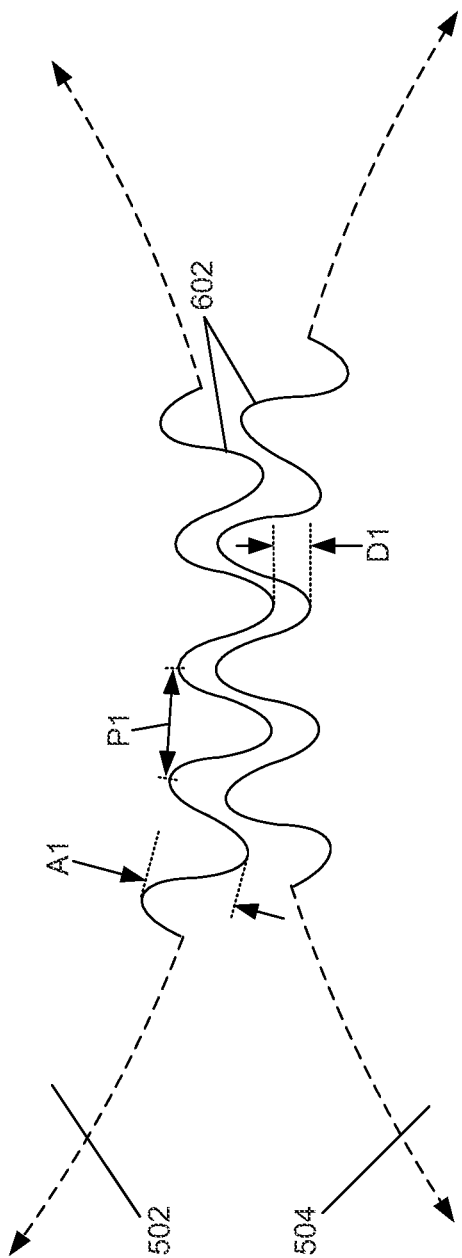
FIG. 6 is an enlarged schematic diagram illustrating an intersection between rollers of a set of rollers of the stretching device shown in FIG. 6.

In some embodiments rollers 502 and 504 are configured to mesh with each other to cooperatively engage with material 424. For example, in some example embodiments where rollers 502 and 504 include teeth 602, the teeth 602 are configured to have a period P1 and amplitude A1 as shown in FIG. 6. Rollers 502 and 504 are arranged to have at least a distance D1 (also shown in FIG. 6) between them where material 424 can pass through.

Similarly, in some embodiments rollers 506 and 508 are configured to mate with each other to cooperatively engage with material 424 after it has passed through station 410. For example, in some example embodiments where rollers 506 and 508 include teeth 602, the teeth 602 are configured to have a period P2 and amplitude A2 similar to those shown in FIG. 6. Rollers 506 and 508 are arranged to have at least a distance D2 (similar to distance D1 shown in FIG. 6) between them where material 424 can pass through. In some embodiments, distances D1 and D2 are the same or about the same. In another possible embodiment, distance D2 is less than distance D1, due to the thinning of material 424 before the material exits the interface between rollers 506 and 508.

In this example, drive mechanism 416 generates a force and supplies the force to roller 504 of station 410. Teeth 602 of rollers intermesh with each other, such that the force from roller 504 is transferred to roller 502, such that rollers 502 and 504 rotate at the same rotational speed R1 and R2 (provided that rollers 502 and 504 have the same number of teeth and the same diameter D3). In some embodiments, however, the diameters of rollers 502 and 504 are different and/or rollers 502 and 504 include different numbers of teeth, such that R1 and R2 are not the same.

Some of the force from drive mechanism 416 is also transferred to station 414 by link 412, in some embodiments. The force that is transferred causes rollers 506 and 508 to rotate in the directions of arrows R3 and R4. Link 412 is shown schematically in FIG. 5. More detailed examples of links 412 are illustrated and described with reference to FIGS. 8 and 9.

Stations 410 and 414 are typically separated by a distance L10. In one example, distance L10 is in a range from about 5 inches (about 13 cm) to about 30 inches (about 76 cm), and preferably from about 6 inches (about 15 cm) to about 12 inches (about 30 cm).

During operation, material 424 is supplied to station 410. Rollers 502 and 504 engage material 424 with some of the plurality of teeth 602 as material 424 passes between rollers 502 and 504. Rollers 502 and 504 cause bending of material 424 into an undulating shape generally defined by the shapes of teeth 602. The rotational speeds of rollers 502 and 504 advances material 424 at a linear speed S1. The linear speed S1 is a function of the rotational speed (R1 and R2) and the diameters D3 of rollers 502 and 504. After passing through station 410, material 424 is then passed to station 414. Rollers 506 and 508 engage material 424 with some of the plurality of teeth 602 as material 424 passes therebetween. In some embodiments, further bending of material 424 occurs as the material 424 is engaged between the teeth 602 of the rollers 506 and 508.

Material passes through station 414 at a linear speed S2. In some embodiments S2 is greater than S1. Like S1, S2 is a function of the rotational speed (R3 and R4) and the diameters D4 of rollers 506 and 508. Accordingly, speed S2 can be made to be greater than speed S1 by increasing the diameters D4 of rollers 506 and 508 greater than diameters D3 of rollers 502 and 504. Alternatively (or in addition), speed S2 can be increased by increasing the rotational speeds R3 and R4 of rollers 506 and 508 to speeds greater than the rotational speeds R1 and R2 of rollers 502 and 504. This can be accomplished, for example, with link 412. Separate drive mechanisms 416 are provided for each stage (e.g., 410 and 414) in some embodiments to allow for generation of different rotational speeds.

Because material 424 is exiting station 414 at a greater speed S2 than the material 424 is entering station 410, in some embodiments, a tension (illustrated by force F1 in FIG. 5) is applied to material 424 at or between stations 410 and 414. The force F1 is sufficient to cause material 424 to stretch longitudinally but low enough to prevent necking or fracture. In some embodiments the force F1 is less than the yield strength of material 424. As the material 424 is stretched, the thickness of the material is reduced, resulting in thinned material 426. In some embodiments, however, stations 410 and 414 are operated to have the same speeds S1 and S2, but thinning occurs due to the addition of the undulating shape and a force applied to the elongate strip 424 by stations 410 and 414. As the material thins, the elongate strip material also stretches in the longitudinal direction.

In some embodiments, thinned material 426 is subsequently used as elongate strips 110 and/or 114 to make spacer 106, such as shown in FIGS. 1-3. The spacer 106 is used in some embodiments as part of a sealed unit, such as a window assembly 100, shown in FIG. 1.

In some embodiments, a link similar to link 412 is provided to transfer power directly from a drive mechanism (e.g., 416) to another roller (e.g., roller 502) to cause both rollers to be directly powered, rather than transferring force from one roller to the other roller through the intermeshing teeth. Alternatively, separate drive mechanisms can be provided in some embodiments for each individual roller.

FIG. 6 is an enlarged schematic diagram illustrating an intersection between rollers 502 and 504. Rollers 502 and 504 include a plurality of teeth 602 in this example. Teeth 602 are configured so that they define an amplitude A1 and a period P2. In some embodiments, A1 and P2 are about equal to the amplitude T2 and period L1 of elongate strips 110 and/or 114, as illustrated and described with reference to FIG. 3. D1 is a minimum distance between rollers 502 and 504. D1 is at least great enough to permit material 424 to pass therethrough.

Teeth 602 can have a variety of different shapes, such as sinusoidal, arcuate, square, rectangular, triangular, and other desired shapes. The interaction of the teeth 602 of rollers 502 and 504 can bend elongate strip 424 as desired.

Figure 7:
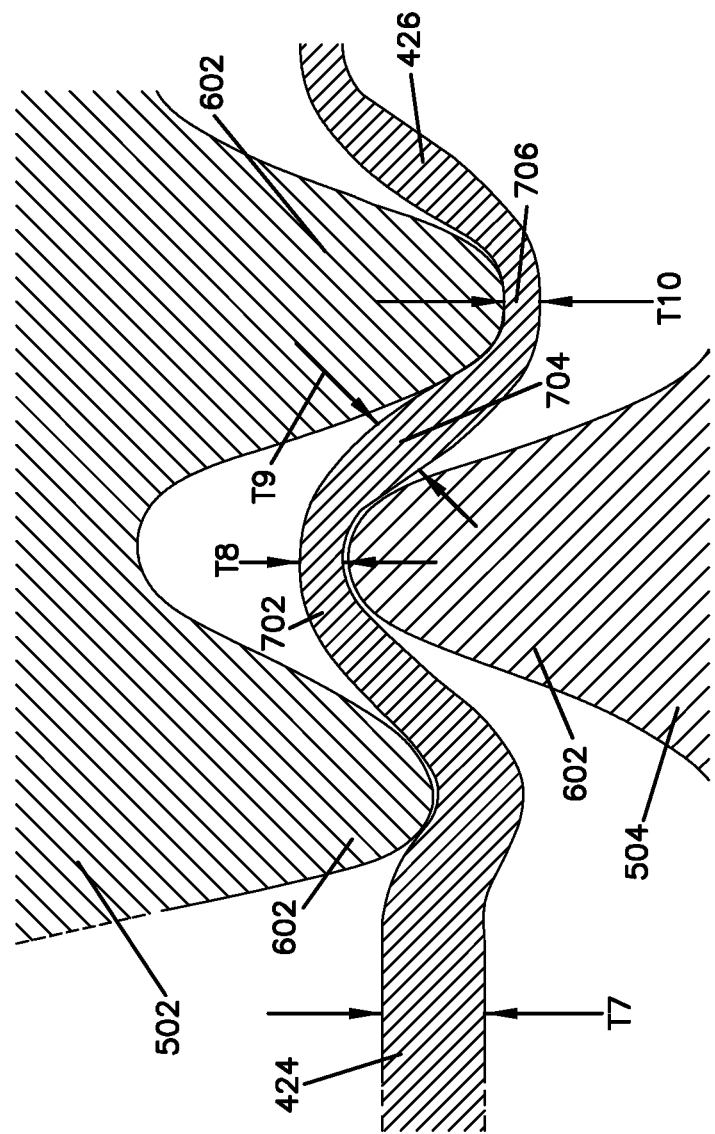
FIG. 7 is a schematic block diagram of the intersection between the set of rollers shown in FIG. 6, during the processing of an elongate strip of material.

FIG. 7 is a schematic block diagram illustrating the intersection between rollers 502 and 504, as shown in FIG. 6, and further including elongate strip material 424 and 426. Rollers 502 and 504 cooperate with rollers 506 and 508 (shown in FIG. 6) to stretch material 424 to form the stretched elongate strip material 426 and, in some embodiments, to bend elongate strip material 426 into an undulating shape. Typically the final shape, however, is defined by rollers 506 and 508, as described herein. The stretching illustrated in FIG. 7 is a hypothetical example of one way that the stretching may occur in an example embodiment.

In this example, material 424 begins with an original thickness T7. As rollers 506 and 508 rotate, the teeth 602 are similarly rotated until they eventually come into contact with material 424. At that time, teeth 602 cause material 424 to bend. In some embodiments rollers 506 and 508 are operated so that the speed at which the teeth 602 are moving is greater than the speed at which material 424 is being supplied. As a result, stretching also occurs.

In some embodiments, stretching of the material 424 is non-uniform and creates a material having a non-uniform thickness. For example, stretching is greater in side portions (e.g., 704) than in peak portions (e.g., 702 and 706), in some embodiments. Peak portions 702 and 706 are portions of material 424 that come into contact with a peak of a tooth 602. Side portions 704 are portions of material 424 between peak portions 702 and 706. For example, thicknesses T8 and T10 are the thicknesses of the peak portions 702 and 706, respectively. Thickness T9 is the thickness of the side portion 704. In some embodiments, thickness T9 is greater than thicknesses T8 and T10 because stretching occurs to a greater extent in the peak portions than in the side portions. In one possible embodiment, T9 is in a range from about 5% to about 75% thicker than T8 and T10. In another possible embodiment, T9 is in a range from about 15% to about 30% thicker than T8 and T10. In yet another possible embodiment, T9 is in a range from about 30% to about 60% thicker than T8 and T10. Other embodiments include other relative thicknesses of the side regions. In some embodiments, stretching results in an average thinning of at least 0.001 inches (about 0.0025 cm), 0.002 inches (about 0.005 cm), 0.003 inches (about 0.008 cm), 0.004 inches (about 0.01 cm), or 0.005 inches (about 0.013 cm). For example, in some embodiments the material 424 has a starting thickness in a range from about 0.003 inches (about 0.008 cm) to about 0.006 inches (about 0.015 cm), and the thinned material 426 has an average thickness in a range from about 0.001 inches (about 0.0025 cm) to about 0.005 inches (about 0.013 cm), and preferably in a range from about 0.001 inches (about 0.0025 cm) to about 0.002 inches (about 0.0051 cm) after stretching. In some embodiments, the average thickness of the elongate strip material 424 is reduced in a range from about 0.001 inches (about 0.0025 cm) to about 0.003 inches (about 0.008 cm) from the original thickness. In some embodiments the average thickness is reduced in a range from about 10 percent to about 50 percent. In some embodiments the average thickness is reduced by at least 10 percent of the original thickness. In some embodiments the average thickness is reduced by at least 20 percent of the original thickness.

Non-uniform thicknesses of material 424 can be advantageous. In some embodiments, the compression strength of the material 424 is greater due to the increased thickness of side portions 704, as compared with a material having a substantially uniform thickness that is equal to an average thickness of thinned material 426. However, in some embodiments system 400 provides uniform or substantially uniform stretching to generate elongate strip material 426 having uniform or substantially uniform thicknesses.

Figure 8:
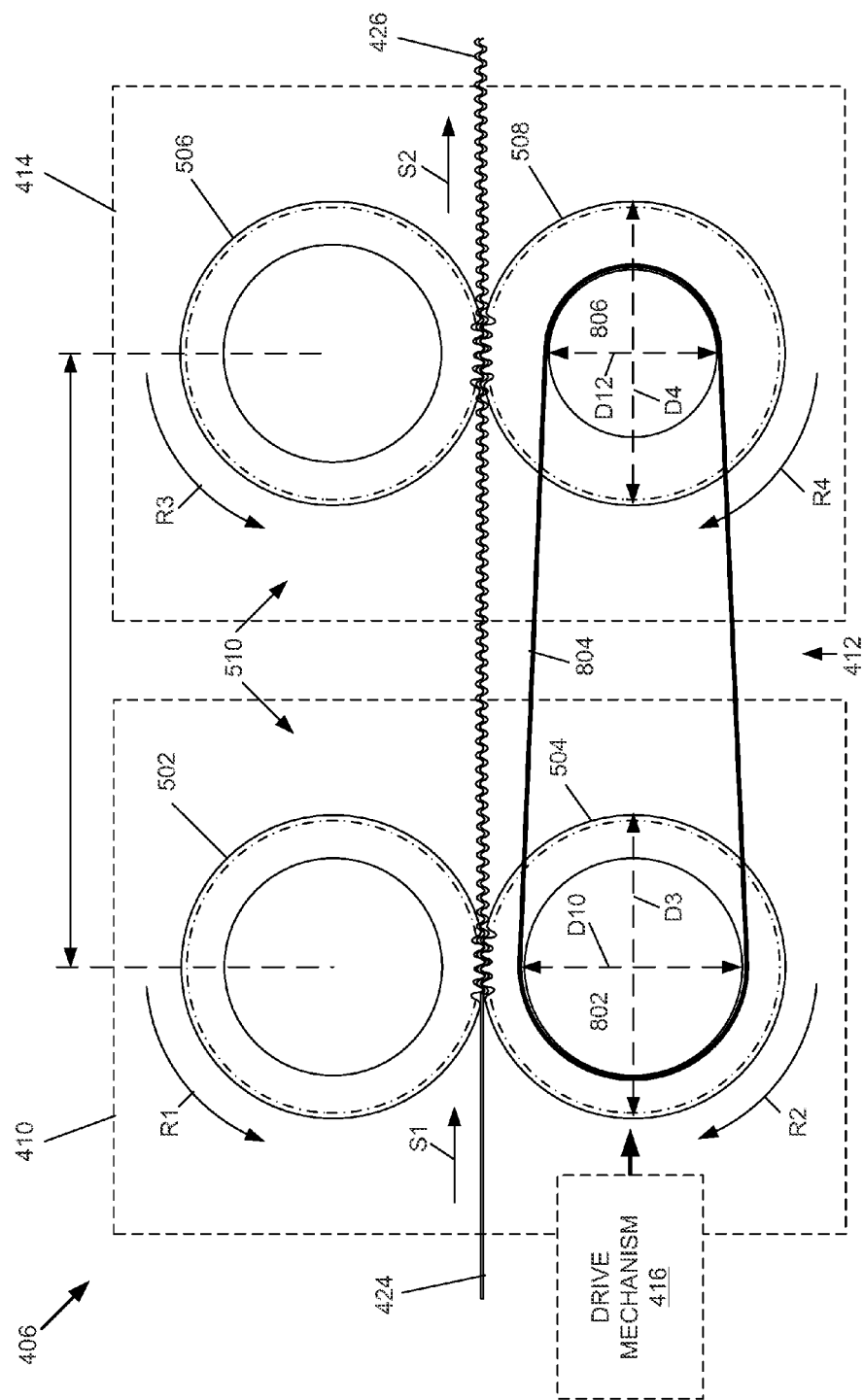
FIG. 8 is a schematic diagram of another example stretching device including a belt.

FIG. 8 is a schematic diagram of another example stretching device 406. Stretching device 406 includes station 410, link 412, and station 414. Station 410 includes rollers 502 and 504. Link 412 includes pulley 802, belt 804, and pulley 806. Station 414 includes rollers 506 and 508. Drive mechanism 416 generates a force that is supplied to a roller, such as roller 504.

In this example, roller 504 is connected to pulley 802 and roller 508 is connected to pulley 806. A link 412 is formed between rollers 504 and 508 by way of a belt 804 that is connected to pulleys 802 and 806. Link 412 (including belt 804 and pulleys 802 and 806) transfers rotational force from roller 504 (such as supplied by drive mechanism 416) to roller 508.

In addition to transferring power, link 412 is also operable in some embodiments to control the relative speeds of rotation of rollers 504 and 508. For example, pulley 802 has a diameter D10 and pulley 806 has a diameter D12. If diameter D10 is equal to diameter D12, then the rotational speed R2 of roller 504 will be equal to rotational speed R4 of roller 508. However, if diameter D12 is less than diameter D10, then the rotational speed R4 will be greater than the rotational speed R2. The relative speed can be adjusted by adjusting the diameters D10 and D12, so as to achieve the desired amount of stretching.

In another possible embodiment, link 412 includes a chain. For example, a chain is used in place of belt 804. Also in this example, sprockets can be used in place of pulleys 802 and 806 to connect the chain with the respective rollers.

Further, although reference is made to connections to specific rollers (e.g., 504 and 508), other possible embodiments include connections to other rollers (e.g., rollers 502 and 506).

Figure 9:
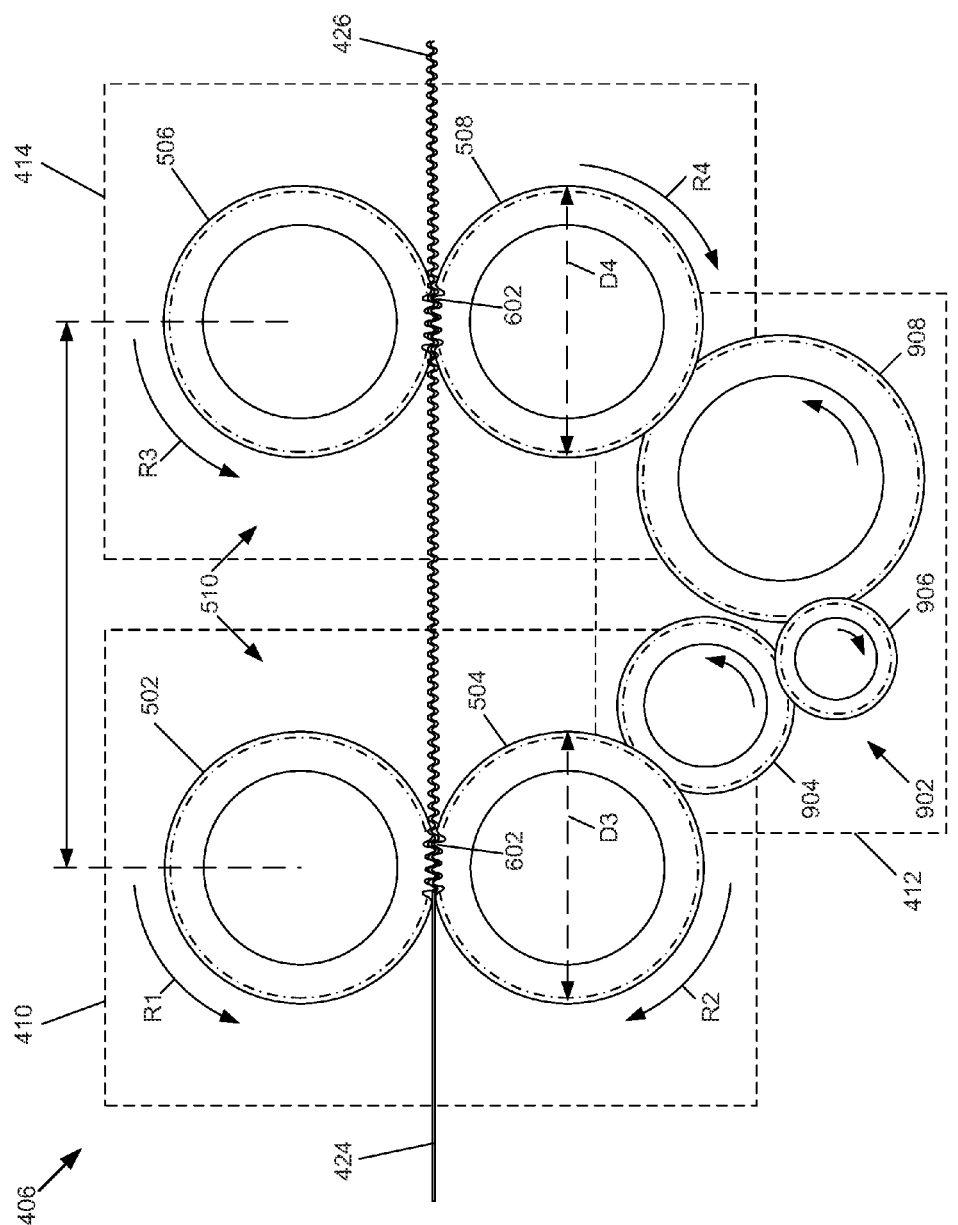
FIG. 9 is a schematic diagram of another example stretching device including a gear assembly.

FIG. 9 is a schematic diagram of another example stretching device 406. Stretching device 406 includes station 410, link 412, and station 414. Station 410 includes rollers 502 and 504. Link 412 includes gear assembly 902. Station 414 includes rollers 506 and 508.

In this example, link 412 includes a gear assembly 902 including a plurality of gears, such as gear 904, gear 906, and gear 908. The gear assembly 902 is connected to roller 504 at an input gear 904, and to roller 508 at an output gear 908. Gear assembly 902 can include a variety of different types of gears or other force transfer mechanisms (such as spur gears, screw gears, etc.). The gear assembly 902 is configured to transfer a force from roller 504 to roller 508 (or from roller 508 to roller 504 in another possible embodiment). Gear assembly 902 is arranged and configured to control the relative rotational speeds R2 and R4 of rollers 504 and 508. For example, in some embodiments gear assembly 902 is configured to control rollers 504 and 508 to have equal rotational speeds R2 and R4. In another possible embodiment, gear assembly 902 is configured to control rollers 504 and 508, such that R4 is greater than R2.

Figure 10:
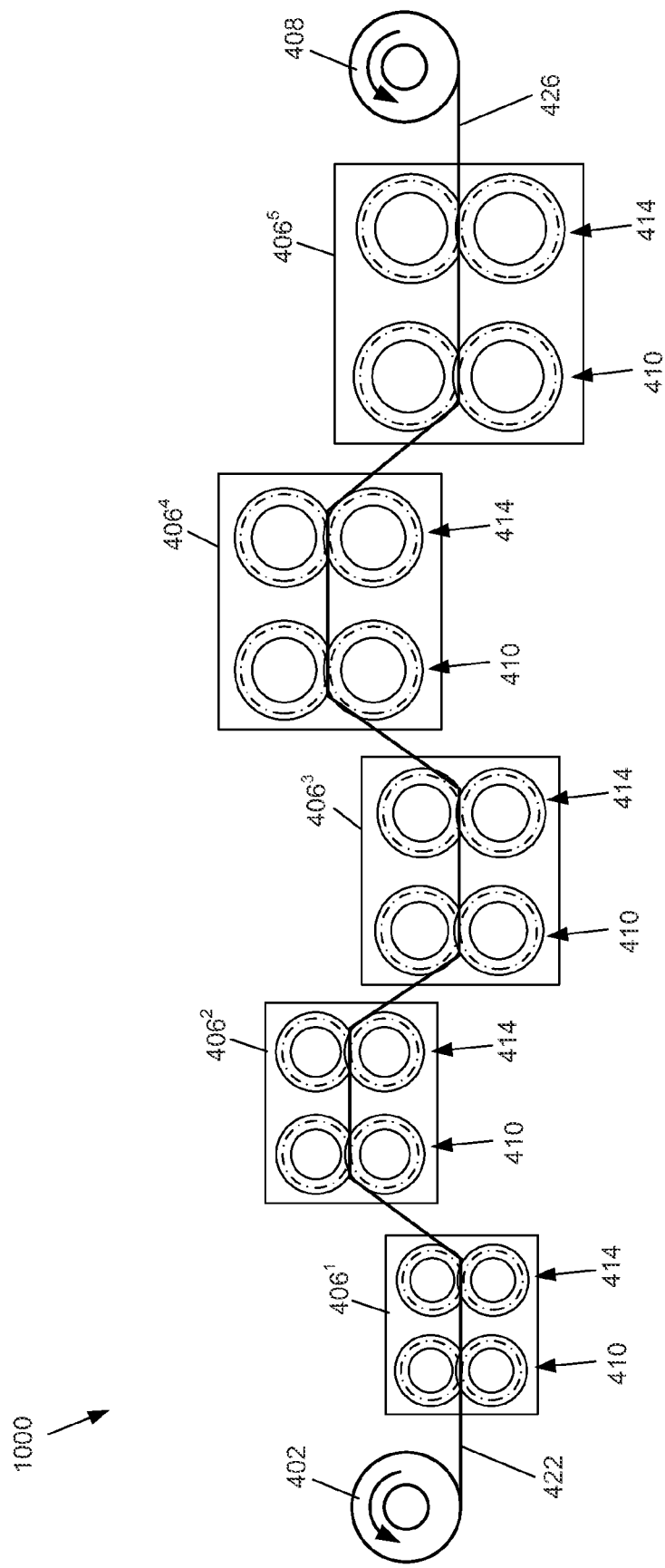
FIG. 10 is a schematic block diagram of an example stretching system including a plurality of stretching devices.

FIG. 10 is a schematic block diagram of another example stretching system 1000. In this example, stretching system 1000 includes material roll 402, a plurality of stretching devices 406, and material roll 408.

In this example, a plurality of stretching devices 406 (including stretching devices $406^1$, $406^2$, $406^3$, $406^4$, $406^5$) are provided to perform multiple stretching operations on material 424. In some embodiments, each stretching device 406 includes an isolation station 410 and a stretching station 414. As discussed above, the stretching station 414 is operated such that the linear speed at the surface of the rollers is greater than the linear speed in the isolation station 410, in some embodiments. For example, the diameter of the rollers in stretching station 414 are greater than the diameter of the rollers in the isolation station 410, and/or the rotational speed of the rollers in the stretching station 414 is greater than the rotational speed of the rollers in the isolation station 410.

Some embodiments of stretching system 1000 includes two or more stretching devices 406, such as including two to ten stretching devices 406. In this example, five stretching devices are provided, including stretching devices $406^1$, $406^2$, $406^3$, $406^4$, and $406^5$.

In one possible embodiment, each stretching device 406 operates to further stretch material 424. In one example, each stretching device 406 stretches material 424 in a range from about 5% to about 30%, or from about 10% to about 20%. As discussed above, the amount of stretching that occurs is based on the difference between the input and output linear speeds of material 424, and can be adjusted, for example, by adjusting the relative diameters of the rollers or by adjusting the relative rotational speeds of the rollers, or both.

In some embodiments, the sizes of the teeth are different in each stretching device. For example, in some embodiments the sizes of the teeth decrease from the first stretching device to the final stretching device. As one specific example, stretching device $406^1$ includes teeth having an amplitude and period of about 0.25 inches (about 0.6 cm), stretching device $406^2$ includes teeth having an amplitude and period of about 0.13 inches (about 0.33 cm), stretching device $406^3$ includes teeth having an amplitude and period of about 0.06 inches (about 0.15 cm), stretching device $406^4$ includes teeth having an amplitude and period of about 0.03 inches (about 0.08 cm), and stretching device $406^5$ includes teeth having an amplitude and period of the final pattern desired for the thinned elongate strip material 426. Other embodiments include other sizes than the specific examples provided here.

Stretching using multiple stretching devices allows a greater amount of stretching to be obtained, in some embodiments, without fracturing the material. As discussed above with reference to FIG. 7, non-uniform stretching may result in thinning of peak portions greater than side portions. By utilizing various stretching stages, the location of the peak portion can be varied to stretch different portions of the material, such as those that were previously side portions. Similarly, the location of peak portions is also varied by utilizing rollers having different tooth sizes in each stretching device. Some embodiments provide a pseudo random stretching pattern, resulting in a more uniformly stretched thinned elongate strip material 426.

EXAMPLES

The following non-limiting examples illustrate various embodiments of this disclosure.

Test 001. A test was conducted using a stainless steel elongate strip material. The material was type 302 annealed stainless steel having an initial thickness of 0.003 inches (0.008 cm) and a width of 0.5 inches (1.3 cm). The material was not gilled. No lubrication was used on the material during the test.

The experimental setup included a first pair of rollers having diameters of 4.2977 inches (about 11 cm) and having 374 teeth (coarse). The teeth had a period of 0.036 inches (about 0.091 cm) and amplitude of 0.114 inches (about 0.29 cm). The setup also included a second pair of rollers that were separated from the first pair of rollers by 9 inches (about 23 cm). The second pair of rollers had diameters of 5.3749 inches (about 14 cm) and having 702 teeth (fine). The teeth had a period of 0.024 inches (about 0.06 cm) and amplitude of 0.0062 inches (about 0.016 cm). The first pair of rollers was connected to the second pair of rollers by a gear assembly.

The material did not break during the test, and resulted in an output material having a width of 0.4925 inches (about 1.3 cm) to 0.4935 inches (about 1.3 cm), an overall thickness of 0.0070 inches (about 0.018 cm) to 0.0080 inches (0.02 cm), and having a period of 0.024 inches (about 0.061 cm). A 23% stretch was obtained. The compression strength was about 7 pounds (about 3.2 kilograms) per inch.

Test 002. A test was conducted using a stainless steel elongate strip material. The material was type 302 annealed stainless steel having an initial thickness of 0.003 inches (about 0.008 cm) and a width of 0.5 inches (about 1.3 cm). The material was not gilled. No lubrication was used on the material during the test.

The experimental setup included a first pair of rollers having diameters of 4.3053 inches (about 11 cm) and having 562 teeth (fine). The teeth had a period of 0.024 inches (about 0.061 cm) and amplitude of 0.0062 inches (about 0.016 cm). The setup also included a second pair of rollers that were separated from the first pair of rollers by 9 inches (about 23 cm). The second pair of rollers had diameters of 5.3749 inches (about 14 cm) and having 702 teeth (fine). The teeth had a period of 0.024 inches (about 0.061 cm) and amplitude of 0.0062 inches (about 0.016 cm). The first pair of rollers was connected to the second pair of rollers by a gear assembly.

The material did not break during the test, and resulted in an output material having a width of 0.4860 inches (about 1.2 cm) to 0.4880 inches (about 1.2 cm), an overall thickness of 0.0074 inches (about 0.019 cm) to 0.0080 inches (about 0.02 cm), and having a period of 0.024 inches (about 0.061 cm). A 23% stretch was obtained. The compression strength was about 7 pounds (about 3.2 kilograms) per inch.

Test 003. A test was conducted using a stainless steel elongate strip material. The material was type 302 annealed stainless steel having an initial thickness of 0.003 inches (about 0.0076 cm) and a width of 0.5 inches (about 1.3 cm). The material was not gilled. No lubrication was used on the material during the test.

The experimental setup included a first pair of rollers having diameters of 4.3053 inches (about 11 cm) and having 562 teeth (fine). The teeth had a period of 0.024 inches (about 0.06 cm) and amplitude of 0.0062 inches (about 0.016 cm). The setup also included a second pair of rollers that were separated from the first pair of rollers by 9 inches (about 23 cm). The second pair of rollers had diameters of 5.3749 inches (about 14 cm) and having 702 teeth (fine). The teeth had a period of 0.024 inches (about 0.06 cm) and amplitude of 0.0062 inches (about 0.016 cm). The first pair of rollers was connected to the second pair of rollers by a belt.

The material did not break during the test, and resulted in an output material having a width of 0.4970 inches (about 1.3 cm) to 0.4979 inches (about 1.3 cm), an overall thickness of 0.0070 inches (about 0.018 cm) to 0.0073 inches (about 0.019 cm), and having a period of 0.024 inches (about 0.061 cm). A 9% stretch was obtained. The compression strength was about 7 pounds (about 3.2 kilograms) per inch.

Test 004. A test was conducted using a stainless steel elongate strip material. The material was type 302 annealed stainless steel having an initial thickness of 0.003 inches (about 0.0076 cm) and a width of 0.5 inches (about 1.3 cm). The material was gilled prior to the first rollers. The gilling was performed using a gill having a diameter of 4.3000 inches (about 11 cm) with 27 teeth. The teeth were 0.125 inches (about 0.32 cm) in length and had a width of 0.025 inches (about 0.064 cm). The gilling included two punctures per inch in four centered rows. The depth of the punctures was 0.010 inches (about 0.025 cm). No lubrication was used on the material during the test. No lubrication was used on the material during the test, but heat guns were used to heat the material.

The experimental setup further included a first pair of rollers having diameters of 4.2977 inches (about 11 cm) and having 374 teeth (coarse). The teeth had a period of 0.036 inches (about 0.09 cm) and amplitude of 0.0114 inches (about 0.03 cm). The setup also included a second pair of rollers that were separated from the first pair of rollers by 9 inches (about 23 cm). The second pair of rollers had diameters of 5.3749 inches (about 14 cm) and having 468 teeth (coarse). The teeth had a period of 0.036 inches (about 0.09 cm) and amplitude of 0.0114 inches (about 0.03 cm). The first pair of rollers was connected to the second pair of rollers by a belt.

The material did break during the test. A 17% stretch was attempted. The compression strength of the material was about 20 pounds (about 9.1 kilograms) per inch.

Test 005. A test was conducted using a stainless steel elongate strip material. The material was type 302 annealed stainless steel having an initial thickness of 0.003 inches (about 0.008 cm) and a width of 0.5 inches (about 1.3 cm). The material was gilled prior to the first rollers. The gilling was performed using a gill having a diameter of 4.3000 inches (about 11 cm) with 27 teeth. The teeth were 0.125 inches (about 0.32 cm) in length and had a width of 0.025 inches (about 0.064 cm). The gilling included two punctures per inch in four centered rows. The depth of the punctures was 0.010 inches (about 0.025 cm). No lubrication was used on the material during the test. No lubrication was used on the material during the test, but heat guns were used to heat the material.

The experimental setup further included a first pair of rollers having diameters of 4.2977 inches (about 11 cm) and having 374 teeth (coarse). The teeth had a period of 0.036 inches (about 0.091 cm) and amplitude of 0.0114 inches (about 0.029 cm). The setup also included a second pair of rollers that were separated from the first pair of rollers by 9 inches (about 23 cm). The second pair of rollers had diameters of 5.3749 inches (about 14 cm) and having 468 teeth (coarse). The teeth had a period of 0.036 inches (about 0.09 cm) and amplitude of 0.0114 inches (about 0.03 cm). The first pair of rollers was connected to the second pair of rollers by a belt.

The material did not break during the test. A 13% stretch was obtained. The compression strength was about 20 pounds (about 9.1 kilograms) per inch.

Test 006. A test was conducted using a stainless steel elongate strip material. The material was type 302 annealed stainless steel having an initial thickness of 0.003 inches (about 0.0076 cm) and a width of 0.5 inches (about 1.3 cm). The material was gilled prior to the first rollers. The gilling was performed using a gill having a diameter of 4.3000 inches (about 11 cm) with 27 teeth. The teeth were 0.125 inches (about 0.32 cm) in length and had a width of 0.025 inches (about 0.064 cm). The gilling included two punctures per inch in four centered rows. The depth of the punctures was 0.010 inches (about 0.025 cm). No lubrication was used on the material during the test.

The experimental setup further included a first pair of rollers having diameters of 4.2977 inches (about 11 cm) and having 374 teeth (coarse). The teeth had a period of 0.036 inches (about 0.09 cm) and amplitude of 0.0114 inches (about 0.03 cm). The setup also included a second pair of rollers that were separated from the first pair of rollers by 9 inches (about 23 cm). The second pair of rollers had diameters of 5.3749 inches (about 14 cm) and having 468 teeth (coarse). The teeth had a period of 0.036 inches (about 0.09 cm) and amplitude of 0.0114 inches (about 0.03 cm). The first pair of rollers was connected to the second pair of rollers by a gear assembly.

The material did not break during the test. A 23% stretch was obtained. The compression strength was about 20 pounds (about 9.1 kilograms) per inch.

Test 007. A test was conducted using a stainless steel elongate strip material. The material was type 302 annealed stainless steel having an initial thickness of 0.003 inches (about 0.0076 cm) and a width of 0.5 inches (about 1.3 cm). The material was not gilled and no lubrication was used on the material during the test.

The experimental setup included a first pair of rollers having diameters of 4.2977 inches (about 11 cm) and having 374 teeth (coarse). The teeth had a period of 0.036 inches (about 0.091 cm) and amplitude of 0.0114 inches (about 0.029 cm). The setup also included a second pair of rollers that were separated from the first pair of rollers by 9 inches (about 23 cm). The second pair of rollers had diameters of 5.3749 inches (about 14 cm) and having 468 teeth (coarse). The teeth had a period of 0.036 inches (about 0.091 cm) and amplitude of 0.0114 inches (about 0.029 cm). The first pair of rollers was connected to the second pair of rollers by a belt.

The material did break during the test. A 33% stretch was attempted. The compression strength was about 20 pounds (about 9.1 kilograms) per inch.

Test 008. A test was conducted using a stainless steel elongate strip material. The material was type 302 annealed stainless steel having an initial thickness of 0.003 inches (about 0.0076 cm) and a width of 0.5 inches (about 1.3 cm). The material was gilled prior to the first rollers. The gilling was performed using a gill having a diameter of 4.3000 inches (about 11 cm) with 27 teeth. The teeth were 0.125 inches (about 0.32 cm) in length and had a width of 0.025 inches (about 0.064 cm). The gilling included two punctures per inch in two centered rows. The depth of the punctures was 0.005 inches (about 0.013 cm). No lubrication was used on the material during the test.

The experimental setup further included a first pair of rollers having diameters of 4.2977 inches (about 11 cm) and having 374 teeth (coarse). The teeth had a period of 0.036 inches (about 0.091 cm) and amplitude of 0.0114 inches (about 0.029 cm). The setup also included a second pair of rollers that were separated from the first pair of rollers by 9 inches (about 23 cm). The second pair of rollers had diameters of 5.3749 inches (about 14 cm) and having 468 teeth (coarse). The teeth had a period of 0.036 inches (about 0.09 cm) and amplitude of 0.0114 inches (about 0.03 cm). The first pair of rollers was connected to the second pair of rollers by a belt.

The material did not break during the test. A 17% stretch was obtained. The compression strength was about 20 pounds (about 9.1 kilograms) per inch.

Test 009. A test was conducted using a stainless steel elongate strip material. The material was type 302 annealed stainless steel having an initial thickness of 0.003 inches (about 0.0076 cm) and a width of 0.5 inches (about 1.3 cm). The material was not gilled and no lubrication was used on the material during the test.

The experimental setup included a first pair of rollers having diameters of 4.2977 inches (about 11 cm) and having 374 teeth (coarse). The teeth had a period of 0.036 inches (about 0.09 cm) and amplitude of 0.0114 inches (about 0.03 cm). The setup also included a second pair of rollers that were separated from the first pair of rollers by 9 inches (about 23 cm). The second pair of rollers had diameters of 5.3749 inches (about 14 cm) and having 468 teeth (coarse). The teeth had a period of 0.036 inches (about 0.09 cm) and amplitude of 0.0114 inches (about 0.03 cm). The first pair of rollers was connected to the second pair of rollers by a belt.

The material did break during the test. A 29% stretch was attempted. The compression strength was about 20 pounds (about 9.1 kilograms) per inch.

Test 010. A test was conducted using a stainless steel elongate strip material. The material was type 302 annealed stainless steel having an initial thickness of 0.003 inches (about 0.0076 cm) and a width of 0.5 inches (about 1.3 cm). The material was not gilled and no lubrication was used on the material during the test.

The experimental setup included a first pair of rollers having diameters of 4.2977 inches (about 11 cm) and having 374 teeth (coarse). The teeth had a period of 0.036 inches (about 0.09 cm) and amplitude of 0.0114 inches (about 0.03 cm). The setup also included a second pair of rollers that were separated from the first pair of rollers by 9 inches (about 23 cm). The second pair of rollers had diameters of 5.3635 inches (about 14 cm) and were smooth with no teeth. The first pair of rollers was connected to the second pair of rollers by a gear assembly.

The material did not break during the test. A 23% stretch was obtained. The compression strength was about 20 pounds (about 9.1 kilograms) per inch.

Test 011. A test was conducted using a stainless steel elongate strip material. The material was type 302 annealed stainless steel having an initial thickness of 0.003 inches (about 0.0076 cm) and a width of 0.5 inches (about 1.3 cm). The material was gilled prior to the first rollers. The gilling was performed using a gill having a diameter of 4.3000 inches (about 11 cm) with 27 teeth. The teeth were 0.125 inches (about 0.3 cm) in length and had a width of 0.025 inches (about 0.06 cm). The gilling included two punctures per inch in two centered rows. The depth of the punctures was 0.010 inches (about 0.025 cm). No lubrication was used on the material during the test. No lubrication was used on the material during the test, but heat guns were used to heat the material.

The experimental setup further included a first pair of rollers having diameters of 4.2977 inches (about 11 cm) and having 374 teeth (coarse). The teeth had a period of 0.036 inches (about 0.09 cm) and amplitude of 0.0114 inches (about 0.03 cm). The setup also included a second pair of rollers that were separated from the first pair of rollers by 9 inches (about 23 cm). The second pair of rollers had diameters of 5.3749 inches (about 14 cm) and having 702 teeth (fine). The teeth had a period of 0.024 inches (about 0.06 cm) and amplitude of 0.0062 inches (about 0.016 cm). The first pair of rollers was connected to the second pair of rollers by a gear assembly.

The material did break during the test. A 23% stretch was attempted. The compression strength of the material was about 7 pounds (about 3.2 kilograms) per inch.

Test 012. A test was conducted using a stainless steel elongate strip material. The material was type 302 annealed stainless steel having an initial thickness of 0.003 inches (about 0.0076 cm), a width of 0.5 inches (about 1.3 cm), and a length of about 6400 feet (about 2e+003 meters). The material was not gilled and no lubrication was used on the material during the test.

The experimental setup included a first pair of rollers having diameters of 4.2977 inches (about 11 cm) and having 374 teeth (coarse). The teeth had a period of 0.036 inches (about 0.09 cm) and amplitude of 0.0114 inches (about 0.03 cm). The setup also included a second pair of rollers that were separated from the first pair of rollers by 9 inches (about 23 cm). The second pair of rollers had diameters of 5.3749 inches (about 14 cm) and having 702 teeth (fine). The teeth had a period of 0.024 inches (about 0.06 cm) and amplitude of 0.0062 inches (about 0.016 cm). The first pair of rollers was connected to the second pair of rollers by a belt.

The material did not break during the test, and resulted in an output material having a width of 0.497 inches (about 1.3 cm), a length of about 7000 feet (about 2.1 kilometers), an overall thickness of 0.0075 inches (about 0.019 cm) to 0.0080 inches (about 0.02 cm), and having a period of 0.024 inches (about 0.061 cm). A 9% stretch was obtained. The compression strength was about 7 pounds (about 3.2 kilograms) per inch.

Test 013. A test was conducted using a stainless steel elongate strip material. The material was type 302 annealed stainless steel having an initial thickness of 0.003 inches (about 0.0076 cm), a width of 0.5 inches (about 1.3 cm), and a length of about 6400 feet (about 2.3 kilometers). The material was gilled prior to the first rollers. The gilling was performed using a gill having a diameter of 4.2900 inches (about 11 cm) with 54 teeth. The teeth were 0.125 inches (about 0.32 cm) in length and had a width of 0.025 inches (about 0.064 cm). The gilling included four punctures per inch along the centerline.

The depth of the punctures was 0.005 inches (about 0.013 cm). Evaporative oil was used on the material as a lubricant.

The experimental setup further included a first pair of rollers having diameters of 4.2977 inches (about 11 cm) and having 374 teeth (coarse). The teeth had a period of 0.036 inches (about 0.09 cm) and amplitude of 0.0114 inches (about 0.03 cm). The setup also included a second pair of rollers that were separated from the first pair of rollers by 9 inches (about 23 cm). The second pair of rollers had diameters of 5.3749 inches (about 14 cm) and having 702 teeth (fine). The teeth had a period of 0.024 inches (about 0.06 cm) and amplitude of 0.0062 inches (about 0.016 cm). The first pair of rollers was connected to the second pair of rollers by a belt.

The material did not break during the test, and resulted in an output material having a width of 0.497 inches (about 1.3 cm), a length of about 7000 feet (about 2.3 kilometers), an overall thickness of 0.0075 inches (about 0.02 cm) to 0.0080 inches (about 0.02 cm), and having a period of 0.024 inches (about 0.06 cm). A 9% stretch was obtained.

Test 014. A test was conducted using a stainless steel elongate strip material. The material was type 302 annealed stainless steel having an initial thickness of 0.003 inches (about 0.0076 cm) and a width of 0.5 inches (about 1.3 cm). The material was not gilled and no lubrication was used on the material during the test.

The experimental setup included a first pair of rollers having diameters of 4.3053 inches (about 11 cm) and having 562 teeth (fine). The teeth had a period of 0.024 inches (about 0.061 cm) and amplitude of 0.0062 inches (about 0.016 cm). The setup also included a second pair of rollers that were separated from the first pair of rollers by 9 inches (about 23 cm). The second pair of rollers had diameters of 5.3749 inches (about 14 cm) and having 702 teeth (fine). The teeth had a period of 0.024 inches (about 0.061 cm) and amplitude of 0.0062 inches (about 0.016 cm). The first pair of rollers was connected to the second pair of rollers by a belt.

The material did not break during the test, although the test was only performed on a short amount of material. A 29% stretch was obtained. The compression strength was about 7 pounds (about 3.2 kilograms) per inch.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A system for stretching an elongate strip of material for a spacer of a sealed unit, the system comprising:
a first set of rollers having first teeth defining a first uniform height and a first corrugated surface configured to (i) receive the elongate strip of material having a substantially uniform thickness along its length and (ii) form corrugations along a length of the elongate strip of material and extending across a majority of a width of the elongate strip of material;
a second set of rollers having second teeth defining a second uniform height and a second corrugated surface and configured to further form the corrugations along the length of the elongate strip of material;
a drive mechanism coupled to at least one roller of the first set of rollers; and
a link coupling the first set of rollers to the second set of rollers,
wherein the system is further configured to rotate the first and second sets of rollers to apply a tension to a segment of the elongate strip of material as the elongate strip of material passes through the first and second sets of rollers to obtain a stretched elongate strip of material having a non-uniform thickness along its length.

2. The system of claim 1, wherein the link is one of a belt, a gear assembly, and a chain.

3. The system of claim 1, wherein the elongate strip of material is stainless steel.

4. The system of claim 1, wherein the first and second sets of rollers are configured to form the corrugations having a uniform thickness across the width of the stretched elongate strip of material.

5. The system of claim 1, wherein a thickness of the corrugated elongate strip of material is within a range from 0.0001 inches to 0.01 inches.

6. A system for forming one or more stretched metal strips for a spacer of an insulated glass unit, the system comprising:
a first metal strip defining (i) a substantially flat surface and (ii) a substantially uniform thickness along its length;
a first set of corrugated rollers configured to receive the first metal strip and form a stretched first metal strip defining (i) a first corrugated shape and (ii) a non-uniform thickness along its length, the first corrugated shape being defined along the length of the stretched first metal strip, wherein each corrugation of the corrugated shape extends across a majority of a width of the stretched first metal strip,
wherein each corrugated roller of the first set of corrugated rollers has teeth defining a uniform height and a corrugated surface, wherein the first set of corrugated rollers include a first pair of corrugated rollers and a second pair of corrugated rollers arranged in series, and wherein the first pair of corrugated rollers are configured to receive the first metal strip before the second pair of corrugated rollers receive the first metal strip;
a drive mechanism configured to drive the first pair of corrugated rollers and the second pair of corrugated rollers; and
a link coupling the first pair of corrugated rollers to the second pair of corrugated rollers.

7. The system of claim 6, further comprising a gilling station configured to form at least one aperture in the first metal strip before the first metal strip is received by the first set of rollers.

8. The system of claim 6, wherein the drive mechanism is configured to drive the first pair of rollers via one or more other rollers.

9. The system of claim 6, further comprising a first spool configured to provide the first metal strip.

10. The system of claim 6, further comprising a second spool configured to receive the stretched first metal strip.

11. The system of claim 6, wherein the first metal strip is stainless steel.

12. The system of claim 6, further comprising:
a second metal strip defining a substantially flat surface; and
a second set of rollers configured to receive the second metal strip and form a stretched second metal strip defining a second corrugated shape and a non-uniform thickness.

13. The system of claim 12, further comprising a device for depositing a filler between the stretched first and second metal strips, the filler including a desiccant.

14. The system of claim 13, further comprising a device for forming the spacer for the insulated glass unit from the stretched first and second metal strips and the filler.

15. The system of claim 6, wherein the first set of corrugated rollers are configured to form the first corrugated shape having a uniform thickness across the width of the stretched first metal strip.

16. The system of claim 6, wherein a thickness of the corrugated, stretched first metal strip is within a range from 0.0001 inches to 0.01 inches.

* * * * *